US012014102B2

(12) United States Patent
Jung et al.

(10) Patent No.: US 12,014,102 B2
(45) Date of Patent: Jun. 18, 2024

(54) FOLDABLE ELECTRONIC DEVICE FOR DISPLAYING USER INTERFACE AND METHOD THEREFOR

(71) Applicant: Samsung Electronics Co., Ltd., Gyeonggi-do (KR)

(72) Inventors: Eunhye Jung, Gyeonggi-do (KR); Minkyung Kim, Gyeonggi-do (KR); Eunji Ahn, Gyeonggi-do (KR); Seungwon Yim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/589,130

(22) Filed: Jan. 31, 2022

(65) Prior Publication Data

US 2022/0156026 A1 May 19, 2022

Related U.S. Application Data

(63) Continuation of application No. PCT/KR2020/005096, filed on Apr. 16, 2020.

(30) Foreign Application Priority Data

Aug. 7, 2019 (KR) .................. 10-2019-0095894

(51) Int. Cl.
*G06F 3/14* (2006.01)
*G06F 1/16* (2006.01)
(Continued)

(52) U.S. Cl.
CPC .......... *G06F 3/1431* (2013.01); *G06F 1/1641* (2013.01); *G06F 3/0481* (2013.01); *G06F 3/0484* (2013.01)

(58) Field of Classification Search
CPC ..... G06F 3/1431; G06F 1/1641; G06F 3/0484
See application file for complete search history.

(56) References Cited

U.S. PATENT DOCUMENTS 8,654,095 B1 * 2/2014 Cho ..................... G06F 1/1652
345/173
8,786,570 B1 7/2014 Cho et al.
(Continued)

FOREIGN PATENT DOCUMENTS

CN 109917999 6/2019
KR 10-2014-0083244 7/2014
(Continued)

OTHER PUBLICATIONS

PCT/ISA/210 Search Report issued on PCT/KR2020/005096, Jul. 29, 2020, pp. 5.
(Continued)

*Primary Examiner* — William L Bashore
*Assistant Examiner* — Gregory A Distefano
(74) *Attorney, Agent, or Firm* — The Farrell Law Firm, P.C.

(57) ABSTRACT

A foldable electronic device is provided and includes a first display disposed on a first surface of the foldable electronic device and including a first region and a second region wider than the first region; a second display disposed on a second surface of the foldable electronic device opposite to the first surface and disposed to correspond to the first region; a state detection circuit for identifying a folded state and an unfolded state of the foldable electronic device; a processor; and a memory operatively connected to the processor, wherein the unfolded state is a state where a front surface of the first display is exposed toward the first surface, wherein the folded state is a state where, as the foldable electronic device is folded such that the first region and the second region face each other, the second display and a partial region of the first display are exposed toward the first surface. In addition, the memory stores instructions that, when executed, cause the processor to display a first user (Continued)

interface related to an application program being executed on the foldable electronic device through the first display based on the identification, by the state detection circuit, of the unfolded state; and display a first portion of the first user interface through the second display and display a second portion related to the first portion of the first user interface through the partial region of the first display based on the identification, by the state detection circuit, of the folded state.

17 Claims, 26 Drawing Sheets

(51) Int. Cl.
    *G06F 3/0481*     (2022.01)
    *G06F 3/0484*     (2022.01)

(56) References Cited

U.S. PATENT DOCUMENTS

| | | | |
|---|---|---|---|
| 8,988,381 B1* | 3/2015 | Kim | G06F 3/04166 |
| | | | 345/157 |
| 9,170,678 B2 | 10/2015 | Cho et al. | |
| 9,335,793 B2 | 5/2016 | Rothkopf | |
| 9,354,742 B2 | 5/2016 | Nagaraju | |
| 9,733,883 B2 | 8/2017 | Jung | |
| 10,037,054 B2 | 7/2018 | Corbin et al. | |
| 10,082,996 B2 | 9/2018 | Jung | |
| 10,254,863 B2 | 4/2019 | Shin et al. | |
| 10,303,215 B2 | 5/2019 | Corbin et al. | |
| 10,488,883 B2 | 11/2019 | Rothkopf | |
| 10,514,879 B2 | 12/2019 | Jung | |
| 10,963,007 B2* | 3/2021 | de Paz | H05K 5/0226 |
| 2010/0064244 A1* | 3/2010 | Kilpatrick, II | H04M 1/0243 |
| | | | 345/1.3 |
| 2012/0194448 A1 | 8/2012 | Rothkopf | |
| 2013/0127918 A1* | 5/2013 | Kang | G06F 1/3265 |
| | | | 345/660 |
| 2014/0285476 A1* | 9/2014 | Cho | H04M 1/0268 |
| | | | 345/204 |
| 2014/0306908 A1 | 10/2014 | Nagaraju | |
| 2015/0338888 A1* | 11/2015 | Kim | G06F 1/1643 |
| | | | 345/156 |
| 2016/0179236 A1 | 6/2016 | Shin et al. | |
| 2016/0187994 A1* | 6/2016 | La | G06F 3/147 |
| | | | 345/619 |
| 2020/0195877 A1* | 6/2020 | Li | G06F 3/04812 |

FOREIGN PATENT DOCUMENTS

| | | |
|---|---|---|
| KR | 10-2014-0115226 | 9/2014 |
| KR | 1020140122665 | 10/2014 |
| KR | 10-2015-0094477 | 8/2015 |
| KR | 10-2015-0135038 | 12/2015 |
| KR | 10-2016-0080467 | 7/2016 |
| KR | 10-2016-0103599 | 9/2016 |
| KR | 10-2018-0027467 | 3/2018 |

OTHER PUBLICATIONS

PCT/ISA/237 Written Opinion issued on PCT/KR2020/005096, Jul. 29, 2020, pp. 4.

Lenovo foldable smartphone with second display, https://nl.letsgodigital.org/smartphones/lenovo-opvouwbare-smartphone/, pp. 19.

Korean Office Action dated Apr. 22, 2024 issued in counterpart application No. 10-2019-0095894, 10 pages.

* cited by examiner

FOLDABLE ELECTRONIC DEVICE FOR DISPLAYING USER INTERFACE AND METHOD THEREFOR

CROSS-REFERENCE TO RELATED APPLICATION(S)

This application is a Bypass Continuation Application of PCT International Application No. PCT/KR/2020/005096, which was filed on Apr. 16, 2020, in the Korean Intellectual Property Office, and claims priority to Korean Patent Application No. 10-2019-0095894, which was filed on Aug. 7, 2019, in the Korean Intellectual Property Office, the content of each of which is incorporated herein by reference.

BACKGROUND

1. Field

The disclosure relates generally to a foldable electronic device and a method for displaying a user interface.

2. Description of Related Art

As demand for larger screens increases, sizes of electronic devices are also increasing. When the size of the electronic device increases, a user may receive various contents (e.g., a game and a movie) through a large screen, and may easily control the electronic device through a large-sized icon. Despite such advantages, when the size of the electronic device increases, it may be difficult for the user to carry the electronic device. Accordingly, in recent years, a technology development for an electronic device (hereinafter, a "foldable electronic device") including a foldable display that is easier for the user to carry while providing the larger screen is being actively developed.

Because the foldable electronic device has the large screen, when the user wants to consume content in a public region, the user may he disturbed by others viewing his or her electronic device. In addition, since the foldable electronic device uses a large screen, battery consumption of the foldable electronic device may increase as the large screen is actively used.

It is necessary to use a foldable electronic device with a minimal size so as not to be disturbed by other people viewing the display of the electronic device when a user wants to consume content in a public region. In addition, when it is necessary to reduce battery consumption, the foldable electronic device needs to provide content on a reduced screen thereof.

SUMMARY

The present disclosure has been made to address the above-mentioned problems and disadvantages, and to provide at least the advantages described below.

A foldable electronic device according to an embodiment includes a first display disposed on a first surface of the foldable electronic device and including a first region and a second region wider than the first region, a second display disposed on a second surface of the foldable electronic device opposite to the first surface and disposed to correspond to the first region, a state detection circuit for identifying a folded state and an unfolded state of the foldable electronic device, a processor, and a memory operatively connected to the processor, the unfolded state is a state where a front surface of the first display is exposed toward the first surface, the folded state is a state where, as the foldable electronic device is folded such that the first region and the second region face each other, the second display and a partial region of the first display are exposed toward the first surface, and the memory stores instructions that, when executed, cause the processor to display a first user interface related to an application program being executed on the foldable electronic device through the first display based on the identification, by the state detection circuit, of the unfolded state, and display a first portion of the first user interface through the second display and display a second portion related to the first portion of the first user interface through the partial region of the first display based on the identification, by the state detection circuit, of the folded state.

A method for displaying a user interface of a foldable electronic device according to an embodiment includes identifying an unfolded state, wherein the unfolded state is a state where a first display is exposed toward a first surface, identifying a folded state, wherein the folded state is a state where, as the first display is folded, a second display and a partial region of the first display are exposed toward the first surface, displaying a first user interface related to an application program being executed on the foldable electronic device through the first display based on the identification of the unfolded state, and displaying a first portion of the first user interface through the second display and displaying a second portion related to the first portion of the first user interface through the partial region of the first display based on the identification of the folded state.

A storage medium according to an embodiment stores computer readable instructions, and, when executed by a foldable electronic device, the instructions cause the foldable electronic device to identify an unfolded state, wherein the unfolded state is a state where a first display is exposed toward a first surface, identify a folded state, wherein the folded state is a state where, as the first display is folded, a second display and a partial region of the first display are exposed toward the first surface, display a first user interface related to an application program being executed on the foldable electronic device through the first display based on the identification of the unfolded state, and display a first portion of the first user interface through the second display and display a second portion related to the first portion of the first user interface through the partial region of the first display based on the identification of the folded state.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
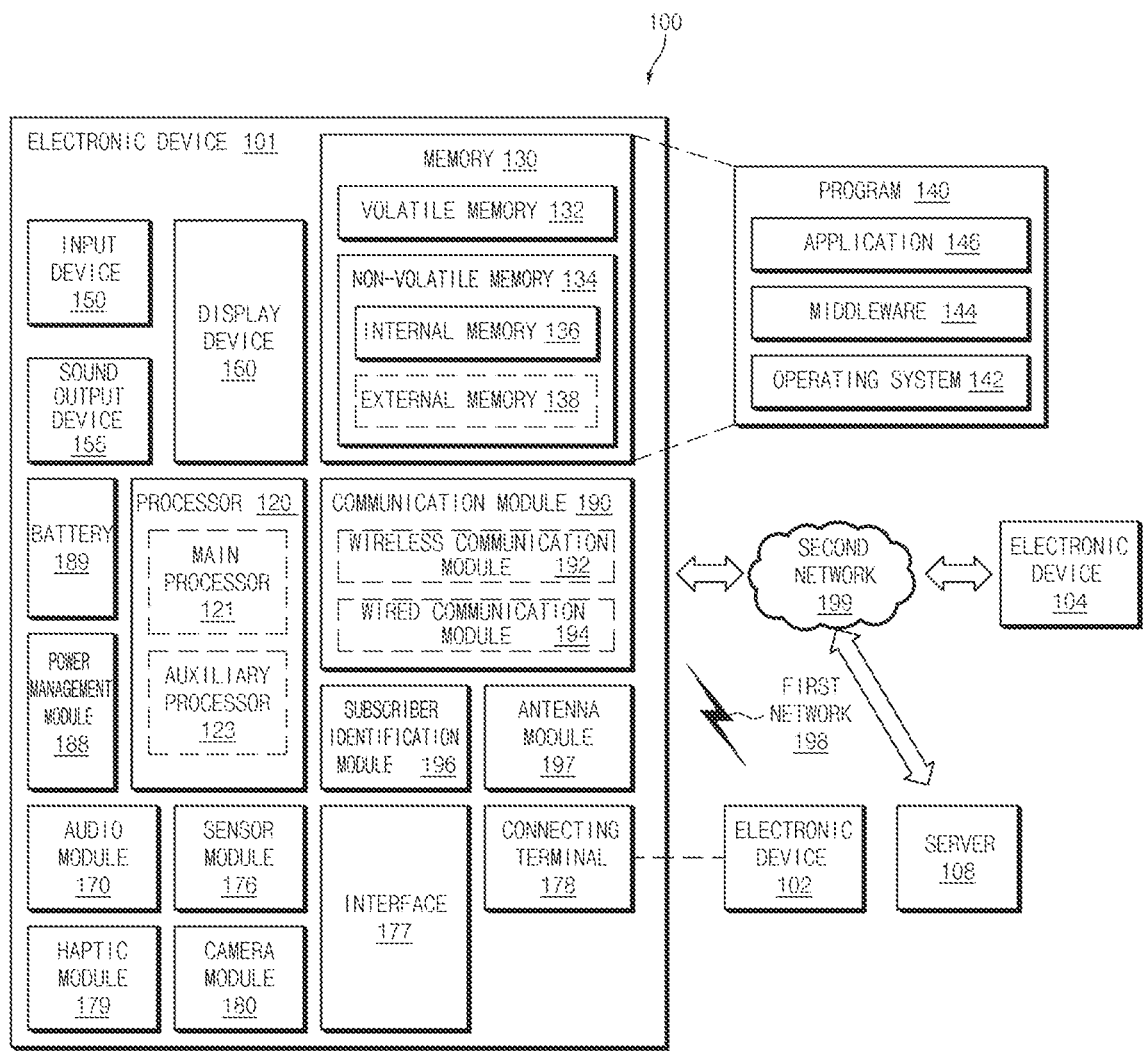
FIG. 1 is a block diagram of an electronic device in a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

According to an embodiment, the foldable electronic device may provide a user interface when the foldable electronic device is used in an unfolded state, even after the foldable electronic device is folded.

According to an embodiment, when a user does not wish to be disturbed by the gaze of other people or when it is necessary to reduce battery consumption, the user interface provided in the unfolded state of the foldable electronic device is provided even after the foldable electronic device is folded, thereby improving user convenience.

In addition, various effects directly or indirectly identified through the disclosure may be provided.

FIG. 1 is a block diagram illustrating an electronic device 101 in a network environment 100, according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According, to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example. Hereinafter, a foldable electronic device 201 (e.g., the electronic device 101 in FIG. 1) according to an embodiment disclosed in the disclosure will be described with reference to FIGS. 2, 3A, 3B, and 4.

Figure 2:
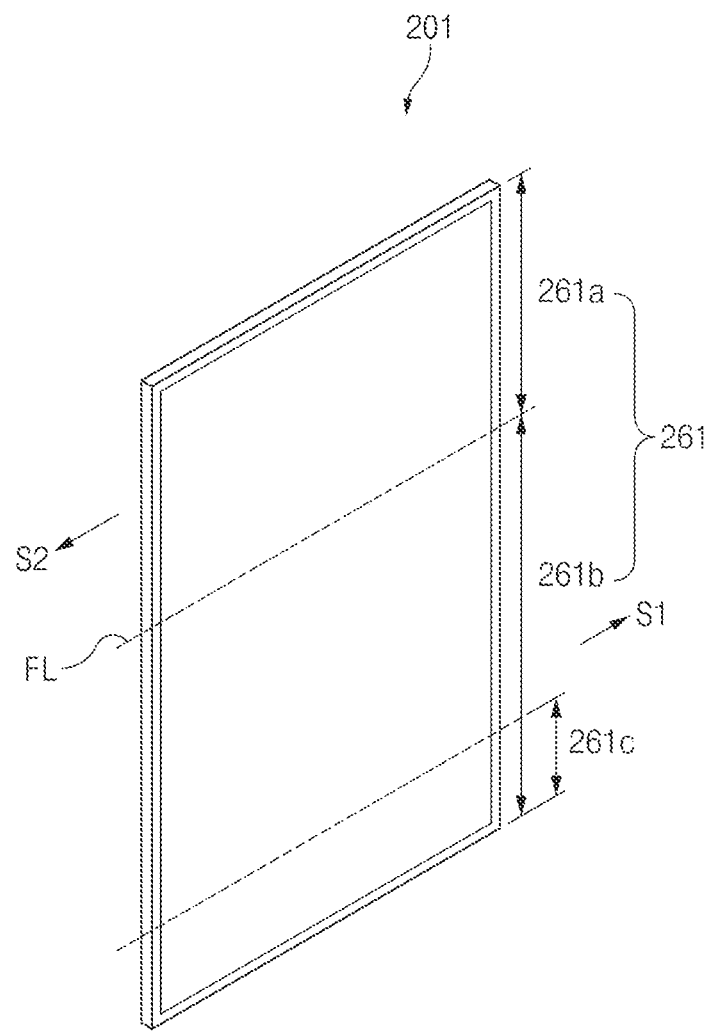
FIG. 2 is a perspective diagram of a foldable electronic device, according to an embodiment.

FIG. 2 is a perspective diagram of the foldable electronic device 201, according to an embodiment.

Referring to FIG. 2, the foldable electronic device 201 may include a first surface S1 and a second surface S2 positioned opposite to the first surface S1.

The foldable electronic device 201 may include a first display 261. The first display 261 may be disposed on the first surface S1 of the foldable electronic device 201.

The first display 261 may include a first region 261a and a second region 261b. The second region 261b of the first display 261 may be wider than the first region 261a. The first region 261a and the second region 261b of the first display 261 may be divided based on a folding line FL.

A third region 261c may be a partial region of the second region 261b. The foldable electronic device 201 may be folded based on the folding line FL such that the first region 261a and the second region 261b face each other. Because the second region 261b is wider than the first region 261a, when the first region 261a and the second region 261b are folded to face each other, a partial region of the second region 261b may not be covered by the first region 261a. The partial region of the second region 261b of the first display 261 may be referred to as the third region 261c.

The first region 261a and the second region 261b of the first display 261 may be one display region connected to each other. The first region 261a and the second region 261b of the first display 261 may be two display regions separated from each other.

FIG. 2 is a diagram illustrating an unfolded state of the foldable electronic device 201. The unfolded state may be a state in which a front surface of the first display 261 is exposed toward the first surface S1. The unfolded state may be a state in which the foldable electronic device 201 is not folded based on the folding line FL.

Figure 3A:
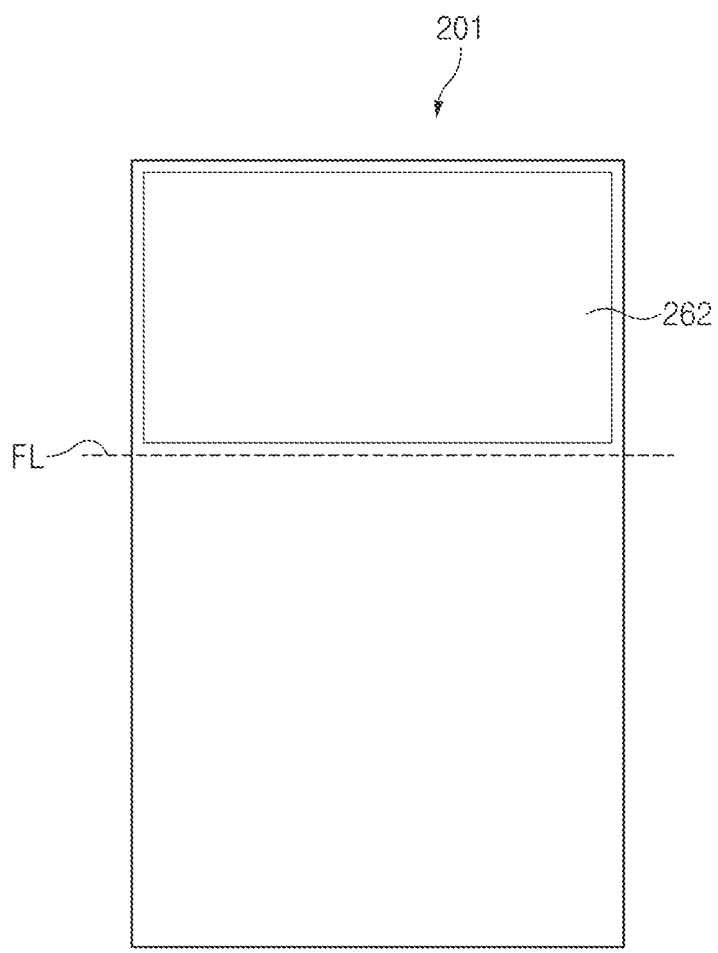
FIG. 3A is a diagram of a foldable electronic device viewed from a second surface, according to an embodiment.
Figure 3B:
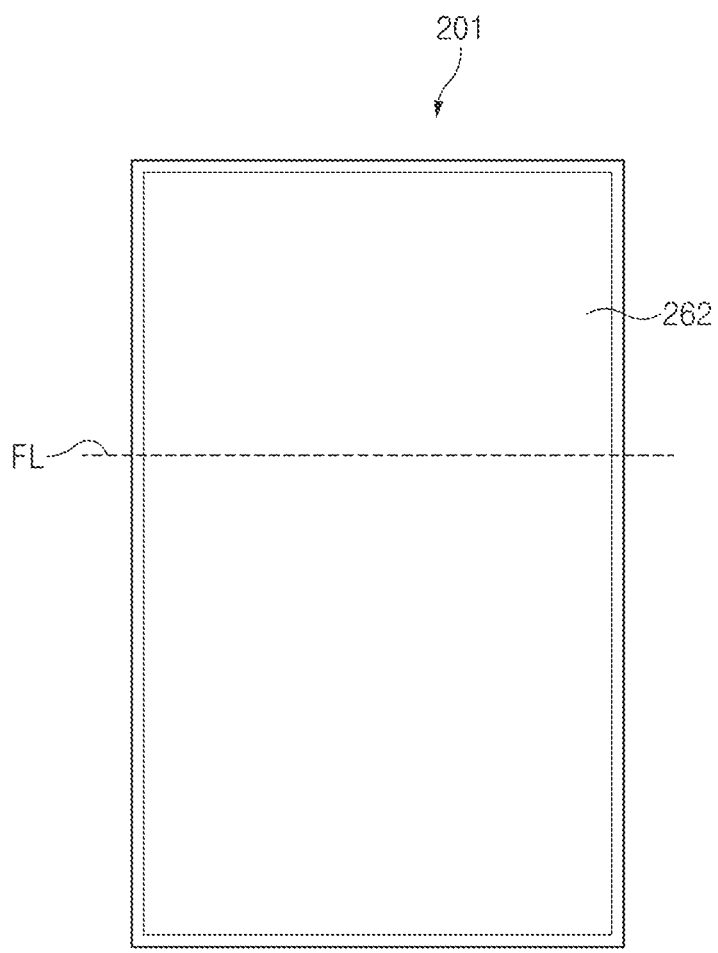
FIG. 3B is a diagram of a foldable electronic device viewed from a second surface, according to an embodiment.

FIGS. 3A and 3B are diagrams of the foldable electronic device 201 viewed from the second surface S2, according to an embodiment.

Referring to FIGS. 3A and 3B, the foldable electronic device 201 may include a second display 262. The second display 262 may be disposed on the second surface S2 of the foldable electronic device 201. At least a portion of the second display 262 may be disposed to correspond to the first region 261a of the first display 261, and may be disposed opposite to the first region 261a of the first display 261.

In the embodiment of FIG. 3A, the second display 262 may be disposed to extend to a region right in front of the folding line FL. In the embodiment of FIG. 3B, the second display 262 may be disposed on an entirety of the second surface S2 beyond the folding line FL.

FIGS. 3A and 3B may alternatively be diagrams illustrating the unfolded state.

Figure 4:
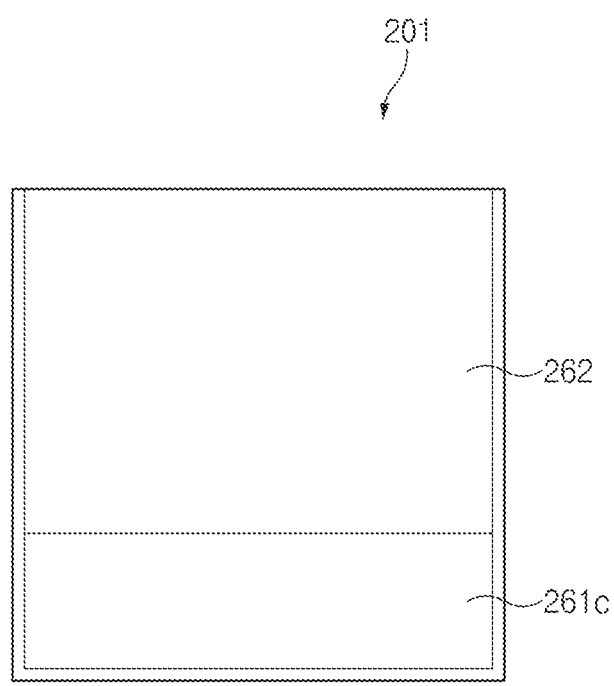
FIG. 4 is a diagram for illustrating a folded state of a foldable electronic device, according to an embodiment.

FIG. 4 is a diagram for illustrating a folded state of the foldable electronic device 201 viewed from the first surface S1, according to an embodiment.

Referring to FIG. 4, the folded state of the foldable electronic device 201 may be a state in which, as the foldable electronic device 201 is folded such that the first region 261a and the second region 261b of the first display 261 face each other, the second display 262 and the third region 261c of the first display 261 are exposed toward the first surface S1.

The foldable electronic device 201 may be folded based on the folding line FL such that the first region 261a and the second region 261b face each other. As the foldable electronic device 201 is folded, the at least a portion of the second display 262 disposed on the second surface S2 to correspond to the first region 261a may be exposed toward the first surface S1. Because the second region 261b is wider than the first region 261a, as the foldable electronic device 201 is folded, the third region 261c that is the partial region of the second region 261b not covered by the first region 261a may be exposed toward the first surface S1.

Hereinafter, with reference to FIG. 5, an operation of the foldable electronic device 201 will be described. For clarity of description, elements and/or portions of the foldable electronic device 201 that are duplicates of those described above will be omitted.

Figure 5:
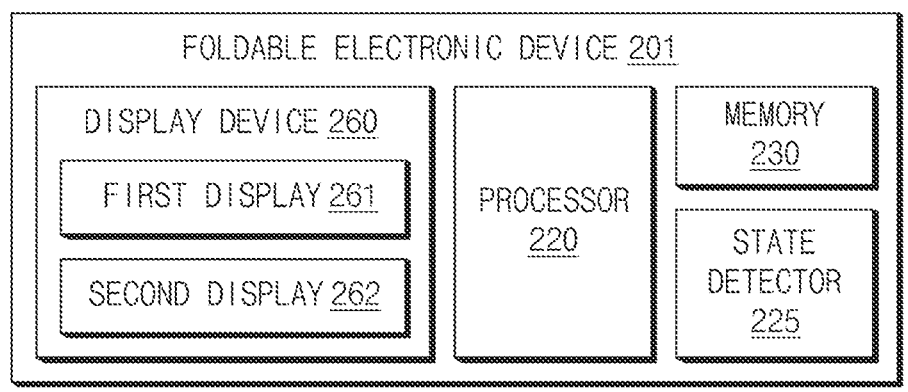
FIG. 5 is a block diagram of a foldable electronic device, according to an embodiment.

FIG. 5 is a block diagram of the foldable electronic device 201, according to an embodiment.

Referring to FIG. 5, the foldable electronic device 201 may include a display device 260, a processor 220, a memory 230, and a state detector 225.

The foldable electronic device 201 may include a smart phone, a tablet, a wearable device, a home appliance, or a digital camera.

The display device 260 may include the first display 261 and the second display 262. The display device 260 may visually provide various information.

The memory 230 may store commands, information, or data related to operations of the components included in the foldable electronic device 201. For example, the memory 230 may store instructions that, when executed, cause the processor 220 to perform various operations described in the disclosure.

The state detector 225 may identify the folded state and the unfolded state of the foldable electronic device 201. The state detector 225 may identify the unfolded state when the first display 261 is exposed toward the first surface S1 of the foldable electronic device 201. The state detector 225 may identify the folded state when the second display 262 is exposed toward the first surface S1 of the foldable electronic device 201. The state detector 225 may transmit the state of the foldable electronic device 201 to the processor 220. The state detector 225 may be implemented in hardware or software (e.g., instructions). The state detector 225 may be referred to as a "state detection circuit" or a "state detection module".

The processor 220 may be operatively coupled to the display device 260. the memory 230, and the state detector 225 to perform overall functions of the foldable electronic device 201. The processor 220 may include at least one processor. The at least one processor may include an ISP, an AP, or a CP.

The processor 220 may display a first user interface related to an application program being executed on the foldable electronic device 201 through the first display 261 based on the foldable electronic device 201 being in the unfolded state.

The first user interface may be a screen of a result of executing the application program. The first user interface may include a first portion and a second portion. The first portion of the first user interface may contain at least a portion of content that acquires data in real time. The second portion of the first user interface may be a portion related to the first portion of the first user interface. The second portion of the first user interface may contain an object related to the content.

The second portion of the first user interface may contain an object that controls the content. The processor 220 may control the content based on that an input of selecting the object is received.

The second portion of the first user interface may be a region that may receive the input related to the content.

Based on the foldable electronic device 201 being in the folded state, the processor 220 may display the first portion of the first user interface through the second display 262, and display the second portion of the first user interface through the third region 261c of the first display 261.

The processor 220 may display a third portion related to the first portion of the first user interface through the third region of the first display 261 based on that an input for the second portion of the first user interface is received when the foldable electronic device 201 is in the folded state. The third portion of the first user interface may be a portion other than the first region and the second region of the first user interface.

When the foldable electronic device 201 is in the unfolded state, the processor 220 may display the first portion, the second portion, and the third portion of the first user interface through the first display 261. When the state detector 225 identifies the folded state of the foldable electronic device 201, the processor 220 may display the first portion of the first user interface through the second display 262, and may display the second portion of the first user interface through the third region of the first display 261. When the user inputs the input (e.g., a swipe input) for the second portion of the first user interface, the processor 220 may display the third portion of the first user interface that was not displayed in the folded state through the third region of the first display 261 based on the input received. A detailed description thereof will be described below with reference to FIGS. 9, 10A, and 10B.

The first user interface displayed through the first display 261 in the unfolded. state of the foldable electronic device 201 may include a portion displayed based on the input. The portion displayed based on the input may not always be displayed through the first display 261 in the unfolded state of the foldable electronic device 201. For example, based on receiving an input of scrolling a main region in a certain direction, the portion displayed based on the input may be displayed through the first display 261. Based on receiving an input of scrolling the main region in a direction other than the certain direction, the portion displayed based on the input may not be displayed through the first display 261. The portion displayed based on the input may be a portion of the first user interface that is temporarily displayed through the first display 261 when an input related to a specific gesture is received. When the foldable electronic device 201 is in the folded state, the processor 220 may display the first portion of the first user interface through the second display 262, and display the portion displayed based on the input of the first user interface through the third region of the first display 261. A detailed description thereof will be described below with reference to FIGS. 15A, 15B, 16, and 17.

When the foldable electronic device 201 is in the folded state, the processor 220 may display the first portion of the first user interface through the second display 262, and display a second user interface through the third region of the first display 261. The second user interface may be a user interface related to the portion displayed based on the input of the first user interface. For example, based on receiving an input of selecting at least a portion of the portion displayed by the foldable electronic device 201, the processor 220 may provide the second user interface capable of providing a function related to the selection. The second user interface may be a user interface provided related to an application program that provides the first user interface as the executed result screen.

Based on receiving the input for the second portion of the first user interface when the foldable electronic device 201 is in the folded state, the processor 220 may display a third user interface related to the application program and the input through the second display 262, and display the second portion of the first user interface through the third region of the first display 261. The third user interface may be a user interface provided related to the application program in response to an input for the second portion of the first user interface.

The foldable electronic device 201 may further include at least one additional component in addition to the components shown in FIG. 5. For example, the foldable electronic device 201 may include a communication module or a connection terminal for performing communication with an electronic device. The components of the foldable electronic device 201 may be the same entity or may constitute separate entities.

The foldable electronic device 201 may include the first display 261 disposed on the first surface S1 of the foldable electronic device. The first display 261 may include the first region 261a, the second region 261b, which is wider than the first region, and the second display 262 disposed on the second surface S2 of the foldable electronic device opposite to the first surface and disposed to correspond to the first region. The foldable electronic device 201 may further include the state detector 225 for identifying a folded state and an unfolded state of the foldable electronic device, the processor 220, and the memory 230 operatively connected to the processor. The unfolded state may be a state where a front surface of the first display is exposed toward the first surface, the folded state may be a state where, as the foldable electronic device is folded such that the first region and the second region face each other, the second display and a partial region of the first display are exposed toward the first surface. The memory may store instructions that, when executed, cause the processor to display a first user interface related to an application program being executed on the foldable electronic device through the first display based on the identification, by the state detection circuit, of the unfolded state, display a first portion of the first user interface through the second display, and display a second portion related to the first portion of the first user interface through the partial region of the first display based on the identification, by the state detection circuit, of the folded state.

The instructions may cause the processor to display at least a portion of content of the first user interface acquiring data in real time through the second display as the first portion, and display an object related to the content of the first user interface through the partial region of the first display as the second portion.

The instructions may cause the processor to control the content based on reception of an input of selecting the object.

The instructions may cause the processor to display a third portion related to the first portion of the first user interface through the partial region of the first display based on reception of an input for the second portion.

The instructions may cause the processor to display, through the partial region of the first display, a portion displayed through the first display based on an input received by the foldable electronic device of the first user interface as the second portion.

The instructions may cause the processor to display at least a portion of content of acquiring data in real time of the first user interface through the second display as the first portion, and display an object related to the content of the first user interface through the partial region of the first display as the second portion.

The instructions may cause the processor to display, through the partial region of the first display, a second user interface related to a portion displayed through the first display based on an input received by the foldable electronic device of the first user interface as the second portion.

The instructions may cause the processor to display, based on reception of an input of selecting the second portion, a second user interface related to the application program and the input through the second display.

A method for displaying a user interface of a foldable electronic device may include identifying an unfolded state, wherein the unfolded state is a state where a first display is exposed toward a first surface, identifying a folded state, wherein the folded state is a state where, as the first display is folded, a second display and a partial region of the first display are exposed toward the first surface, displaying a first user interface related to an application program being executed on the foldable electronic device through the first display based on the identification of the unfolded state, and displaying a first portion of the first user interface through the second display and displaying a second portion related to the first portion of the first user interface through the partial region of the first display based on the identification of the folded state.

The first portion may contain at least a portion of content of the first user interface acquiring data in real time, and the second portion may contain an object related to the content of the first user interface.

The method may further include controlling the content based on reception of an input of selecting the object.

The method may further include displaying a third portion related to the first portion of the first user interface through the partial region of the first display based on reception of an input for the second portion.

The second portion may be a portion displayed through the first display based on an input received by the foldable electronic device of the first user interface.

The second portion may be a second user interface related to a portion displayed through the first display based on an input received by the foldable electronic device of the first user interface.

The method may further include displaying, based on reception of an input of selecting the second portion, a second user interface related to the application program and the input through the second display.

A storage medium may store computer readable instructions, and, when executed by a foldable electronic device, the instructions may cause the foldable electronic device to identify an unfolded state, wherein the unfolded state is a state where a first display is exposed toward a first surface, identify a folded state, wherein the folded state is a state where, as the first display is folded, a second display and a partial region of the first display are exposed toward the first surface, display a first user interface related to an application program being executed on the foldable electronic device through the first display based on the identification of the unfolded state, and display a first portion of the first user interface through the second display and display a second portion related to the first portion of the first user interface through the partial region of the first display based on the identification of the folded state.

The first portion may contain at least a portion of content of the first user interface acquiring data in real time, the second portion may contain an object related to the content of the first user interface, and, when executed by the foldable electronic device, the instructions may further cause the foldable electronic device to control the content based on reception of an input of selecting the object.

When executed by the foldable electronic device, the instructions may further cause the foldable electronic device to display a third portion related to the first portion of the first user interface through the partial region of the first display based on reception of an input for the second portion.

The second portion may be a portion displayed through the first display based on an input received by the foldable electronic device of the first user interface.

When executed by the foldable electronic device, the instructions may further cause the foldable electronic device to display, based on reception of an input of selecting the second portion, a second user interface related to the application program and the input through the second display.

Hereinafter, an operation of a foldable electronic device 201 will be described with reference to FIG. 6. For clarity of description, elements and/or portions of the foldable electronic device 201 that are duplicates of those described above will be omitted.

Hereinafter, it is assumed that the foldable electronic device 201 in FIG. 5 performs a process in FIG. 6. The operation described as being performed by the foldable electronic device 201 may be implemented with instructions (commands) that may be performed (or executed) by a processor 220 of the foldable electronic device. The instructions may be stored in a computer recording medium or the memory 230 of the foldable electronic device 201 illustrated in FIG. 5.

Figure 6:
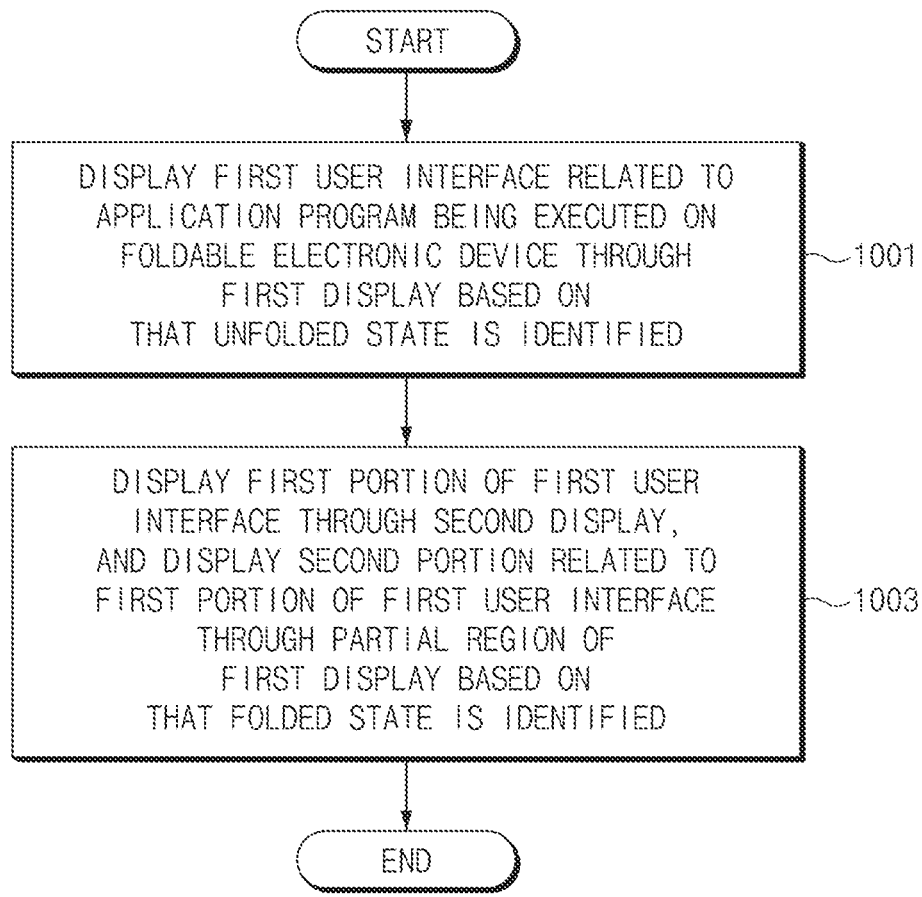
FIG. 6 is a flowchart for illustrating an operation of a foldable electronic device, according to an embodiment.

FIG. 6 is a flowchart for illustrating an operation of a foldable electronic device 201, according to an embodiment.

Referring to FIG. 6, in step 1001, based on the unfolded state of the foldable electronic device being identified, the foldable electronic device displays the first user interface related to the application program being execute on the foldable electronic device through a first display 261.

In step 1003, based on the folded state of the foldable electronic device being identified, the foldable electronic device displays the first portion of the first user interface through a second display (e.g., the second display 262 in FIG. 4), and displays the second portion of the first user interface through a partial region (e.g., the third region 261c in FIG. 4) of the first display. The second portion may be the partial region of the first user interface related to the first portion.

Hereinafter, an operation of a foldable electronic device 201 will be described with reference to FIGS. 7A, 7B, 8A, and 8B. For clarity of description, elements and/or portions of the foldable electronic device 201 that are duplicates of those described above will be omitted.

The operation described as being performed by the foldable electronic device 201 may be implemented with instructions (commands) that may be performed (or executed) by a processor 220 of the foldable electronic device. The instructions may be stored in a computer recording medium or the memory 230 of the foldable electronic device 201 illustrated in FIG. 5.

FIGS. 7A, 7B, 8A, and 8B are diagrams illustrating a first surface S1 of the foldable electronic device 201.

Figure 7A:
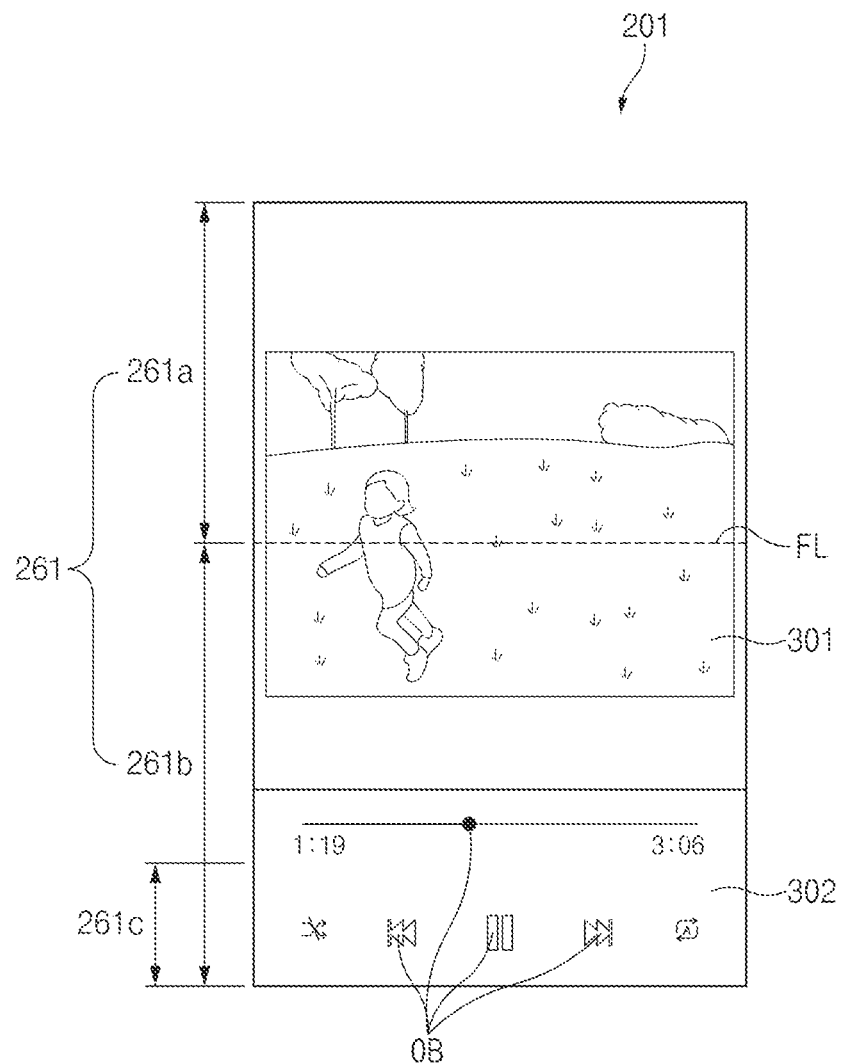
FIG. 7A is a diagram illustrating a first surface of a foldable electronic device, according to an embodiment.
Figure 7B:
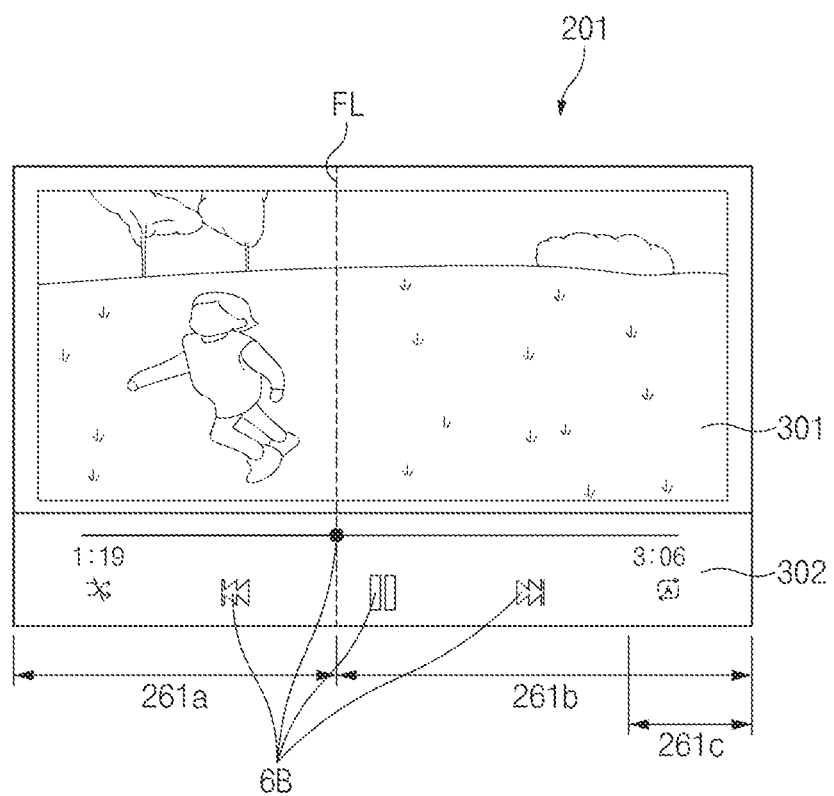
FIG. 7B is a diagram illustrating a first surface of a foldable electronic device, according to an embodiment.

FIGS. 7A and 7B are diagrams illustrating the first user interface displayed through the first display 261 in the unfolded state of the foldable electronic device 201, according to an embodiment. FIG. 7A is a diagram of when the foldable electronic device is used vertically, and FIG. 7B is a diagram of when the foldable electronic device is used horizontally.

Referring to FIGS. 7A and 7B, based on the foldable electronic device 201 being in the unfolded state, the foldable electronic device 201 may display the first user interface related to the application program being executed on the foldable electronic device 201 through the first display 261. As the application program being executed on the foldable electronic device 201, a video player that plays media content will be described as an example.

The first user interface may be a screen of a result of executing the video player. The first user interface may be displayed over the first region 261a and the second region 261b of the first display 261. The first user interface may include a first portion 301 and a second portion 302.

The first portion 301 may contain at least a portion of video content that acquires data in real time. The second portion 302 may contain at least one object OB capable of controlling the video content. Based on an input of selecting the at least one object OB being received, the foldable electronic device 201 may perform a function of rewinding, fast-forwarding, or pausing the video content contained in the first portion 301.

Figure 8A:
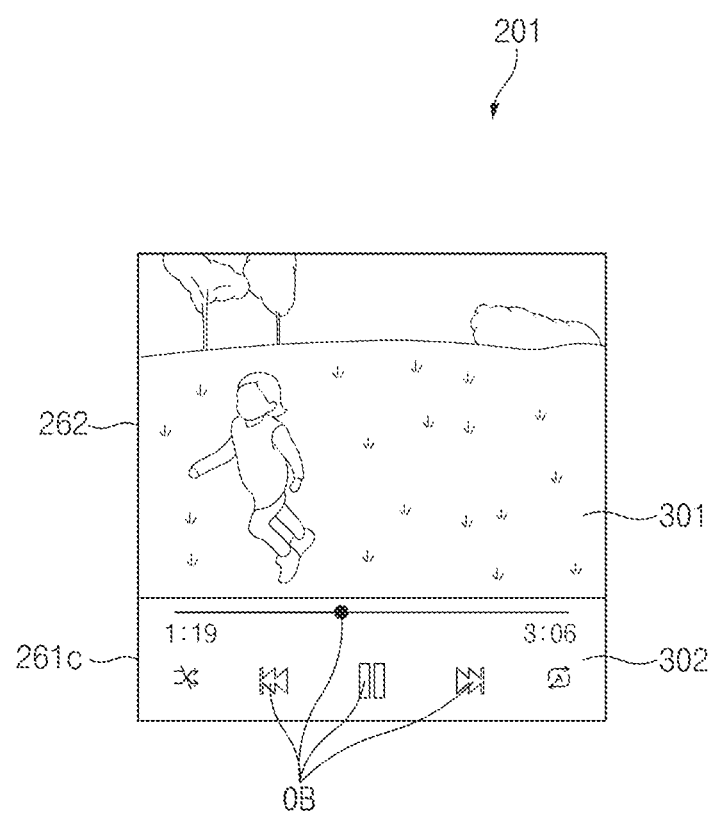
FIG. 8A is a diagram illustrating a first surface of a foldable electronic device, according to an embodiment.
Figure 8B:
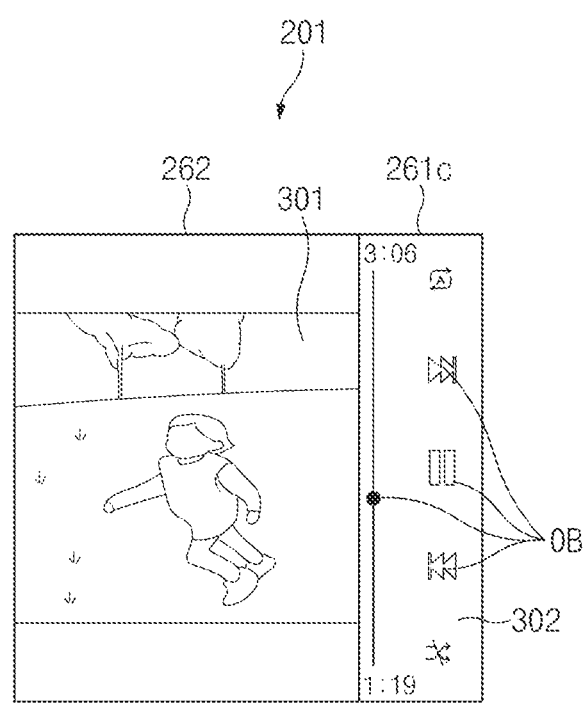
FIG. 8B is a diagram illustrating a first surface of a foldable electronic device, according to an embodiment.

FIGS. 8A and 8B are diagrams illustrating the first portion 301 of the first user interface displayed through the second display 262 and the second portion 302 of the first user interface displayed through the third region 261c of the first display 261 in the folded state of the foldable electronic device, according to an embodiment. FIG. 8A is a diagram of when the foldable electronic device is used vertically, and FIG. 8B is a diagram of when the foldable electronic device is used horizontally.

Referring to FIGS. 8A and 8B, based on the foldable electronic device 201 being in the folded state, the foldable electronic device 201 may display the first portion 301 of the first user interface through the second display 262, and display the second portion 302 of the first user interface through the third region 261c of the first display 261.

The foldable electronic device 201 may display the video content provided in the unfolded state of the foldable electronic device 201 through the second display 262 as the first portion 301. The foldable electronic device 201 may resize the video content provided in the unfolded state of the foldable electronic device 201 and display the resized video content as the first portion 301 through the second display 262.

The foldable electronic device 201 may display the second portion 302 containing the at least one object OB that was provided in the unfolded state of the foldable electronic device 201 through the third region 261c of the first display 261. The foldable electronic device 201 may resize the second portion 302 provided in the unfolded state of the foldable electronic device 201 and display the resized second portion 302 through the third region 261c of the first display 261.

Hereinafter, an operation of a foldable electronic device 201 will be described with reference to FIGS. 9, 10A, and 10B. For clarity of description, elements and/or portions of the foldable electronic device 201 that are duplicates of those described above will be omitted.

The operation described as being performed by the foldable electronic device 201 may be implemented with instructions (commands) that may be performed (or executed) by a processor 220 of the foldable electronic device. The instructions may be stored in a computer recording medium or the memory 230 of the foldable electronic device 201 illustrated in FIG. 5.

Figure 9:
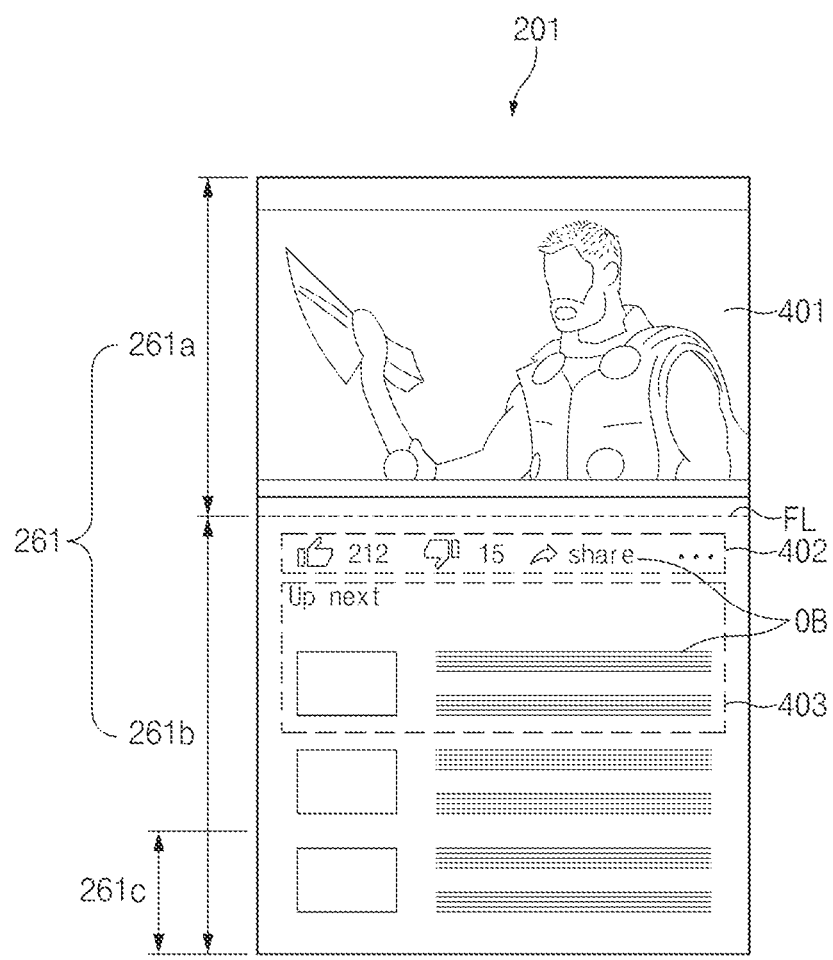
FIG. 9 is a diagram illustrating a first surface of a foldable electronic device, according to an embodiment.
Figure 10A:
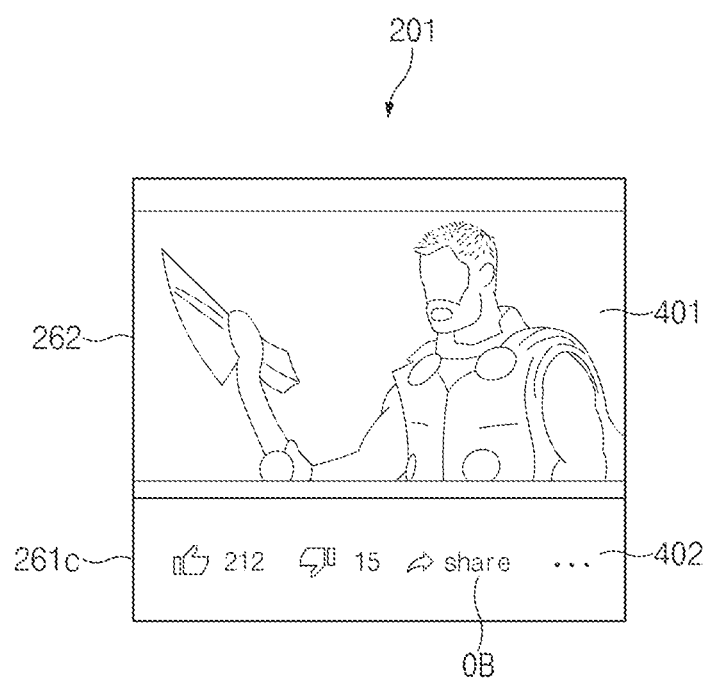
FIG. 10A is a diagram illustrating a first surface of a foldable electronic device, according to an embodiment.
Figure 10B:
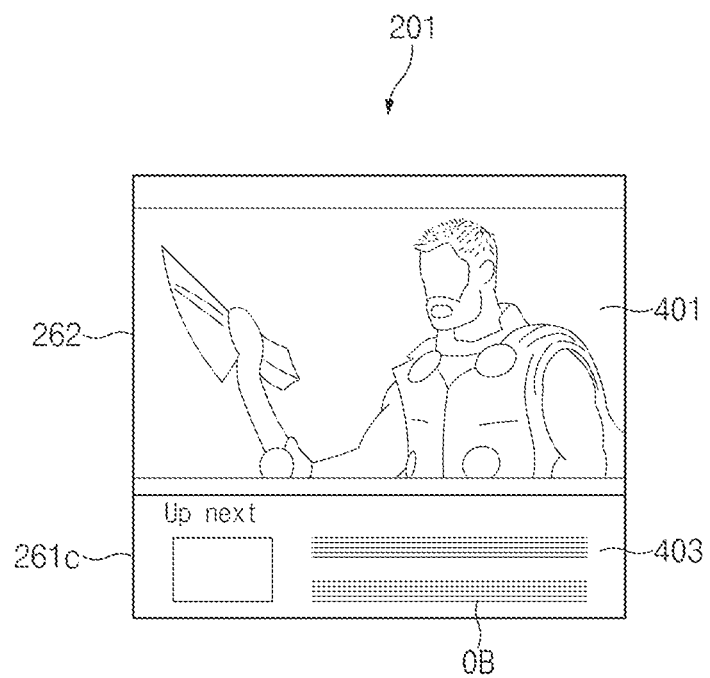
FIG. 10B is a diagram illustrating a first surface of a foldable electronic device, according to an embodiment.

FIGS. 9, 10A, and 10B are diagrams illustrating a first surface S1 of the foldable electronic device 201.

FIG. 9 is a diagram illustrating a second user interface displayed through the first display 261 in the unfolded state of the foldable electronic device 201, according to an embodiment.

Referring to FIG. 9, based on the foldable electronic device 201 being in the unfolded state, the foldable electronic device 201 may display the second user interface related to the application program being executed on the foldable electronic device 201 through the first display 261. As the application program being executed on the foldable electronic device 201, a site providing video and related information thereof will be described as an example.

The second user interface may be a screen of a result of executing the video site. The second user interface may be displayed over the first region 261a and the second region 261b of the first display 261. The second user interface may include a first portion 401, a second portion 402, and a third portion 403.

The first portion 401 may contain at least a portion of the video content that acquires the data in real time. The second portion 402 and the third portion 403 may include the at least one object OB for sharing the video content or providing a list of other video content associated with the video content. The second portion 402 and the third portion 403 may be different portions of the second user interface.

FIG. 10A is a diagram illustrating the first portion 401 of the second user interface displayed through the second display 262 and the second portion 402 of the second user interface displayed through the third region 261c of the first display 261 in the folded state of the foldable electronic device, according to an embodiment.

Referring to FIG. 10A, based on the foldable electronic device 201 being in the folded state, the foldable electronic device 201 may display the first portion 401 of the second user interface through the second display 262, and display the second portion 402 of the second user interface through the third region 261c of the first display 261.

FIG. 10B is a diagram illustrating the first portion 401 of the second user interface displayed through the second display 262 and the third portion 403 of the second user interface displayed through the third region 261c of the first display 261 in the folded state of the foldable electronic device, according to an embodiment.

Referring to FIG. 10B, based on an input for the second portion 402 being received in the folded state in FIG. 10A, the foldable electronic device 201 may display the third portion 403 of the second user interface through the third region 261c of the first display 261. The input may relate to a swipe operation of the user.

Hereinafter, an operation of a foldable electronic device 201 will be described with reference to FIGS. 11 and 12. For clarity of description, elements and/or portions of the foldable electronic device 201 that are duplicates of those described above will be omitted.

The operation described as being performed by the foldable electronic device 201 may be implemented with instructions (commands) that may be performed (or executed) by a processor 220 of the foldable electronic device. The instructions may be stored in a computer recording medium or the memory 230 of the foldable electronic device 201 illustrated in FIG. 5.

Figure 11:
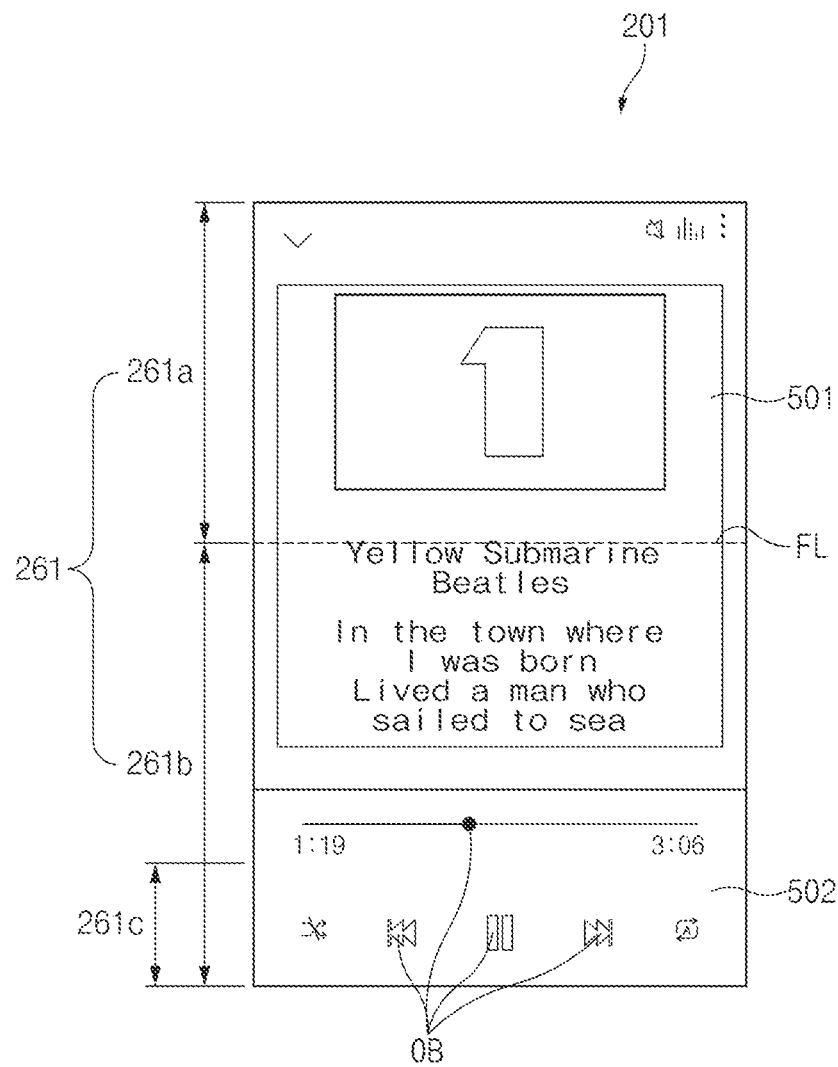
FIG. 11 is a diagram illustrating a first surface of a foldable electronic device, according to an embodiment.
Figure 12:
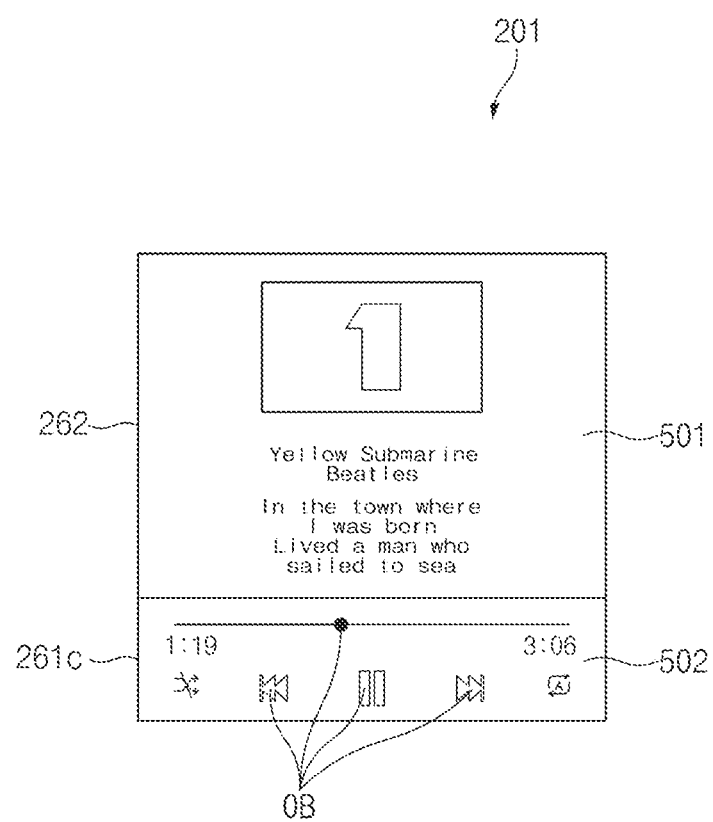
FIG. 12 is a diagram illustrating a first surface of a foldable electronic device, according to an embodiment.

FIGS. 11 and 12 are diagrams illustrating a first surface S1 of the foldable electronic device 201.

FIG. 11 is a diagram illustrating a third user interface displayed through the first display 261 in the unfolded state of the foldable electronic device 201, according to an embodiment.

Referring to FIG. 11, based on the foldable electronic device 201 being in the unfolded state, the foldable electronic device 201 may display the third user interface related to the application program being executed on the foldable electronic device 201 through the first display 261. A music player will be described as an example of the application program being executed on the foldable electronic device 201. The music player may receive data related to lyrics in real time and display the received data on the first display 261. The music player may provide sound source data through a streaming service and display information related thereto on the first display 261.

The third user interface may be a screen of a result of executing the music player. The third user interface may be displayed over the first region 261a and the second region 261b of the first display 261. The third user interface may include a first portion 501 and a second portion 502.

The first portion 501 may contain at least a portion of lyrics content that acquires the data related to the lyrics in real time. The first portion 501 may contain at least a portion of content that acquires the sound source data. based on the streaming service.

The second portion 502 may contain the at least one object OB capable of controlling the content.

FIG. 12 is a diagram illustrating the first portion 501 of the third user interface displayed through the second display 262 and the second portion 502 of the third user interface displayed through the third region 261c of the first display 261 in the folded state of the foldable electronic device, according to an embodiment.

The descriptions of FIGS. 8A and 8B may be applied to the description of FIG. 12.

Hereinafter, an operation of a foldable electronic device 201 will be described with reference to FIGS. 13 and 14. For clarity of description, elements and/or portions of the foldable electronic device 201 that are duplicates of those described above will be omitted.

The operation. described as being performed by the foldable electronic device 201 may be implemented with instructions (commands) that may be performed (or executed) by a processor 220 of the foldable electronic device. The instructions may be stored in a computer recording medium or the memory 230 of the foldable electronic device 201 illustrated in FIG. 5.

Figure 13:
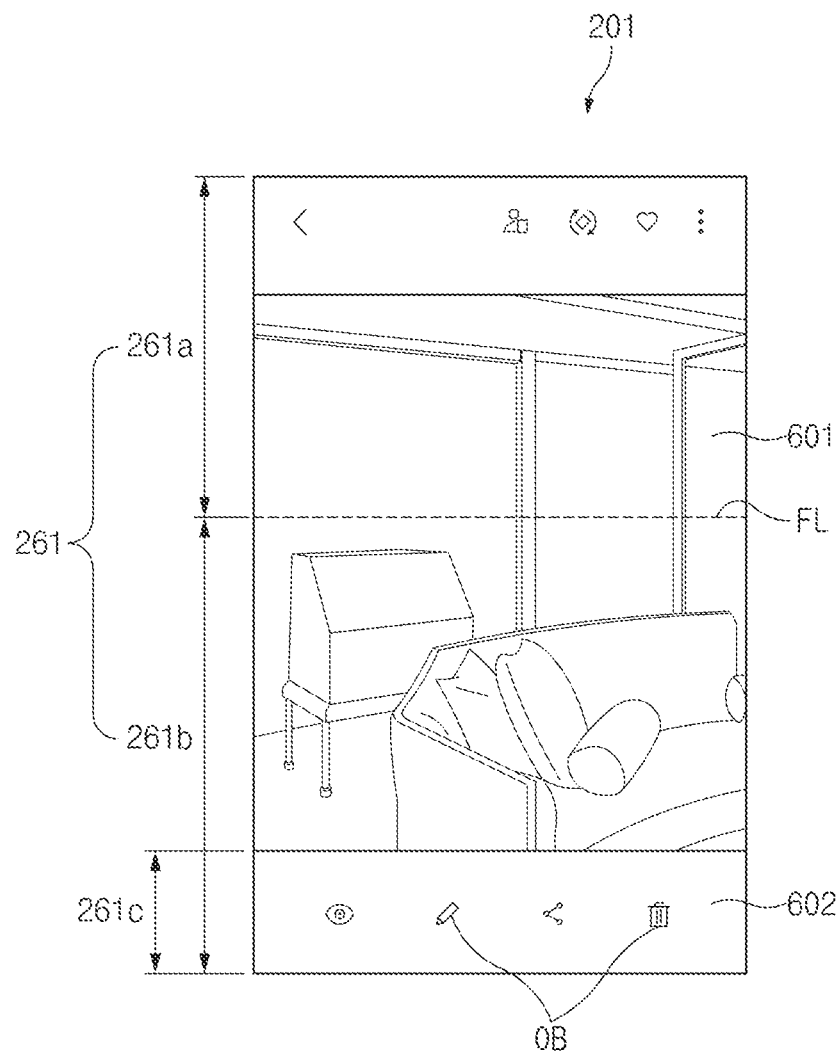
FIG. 13 is a diagram illustrating a first surface of a foldable electronic device, according to an embodiment.
Figure 14:
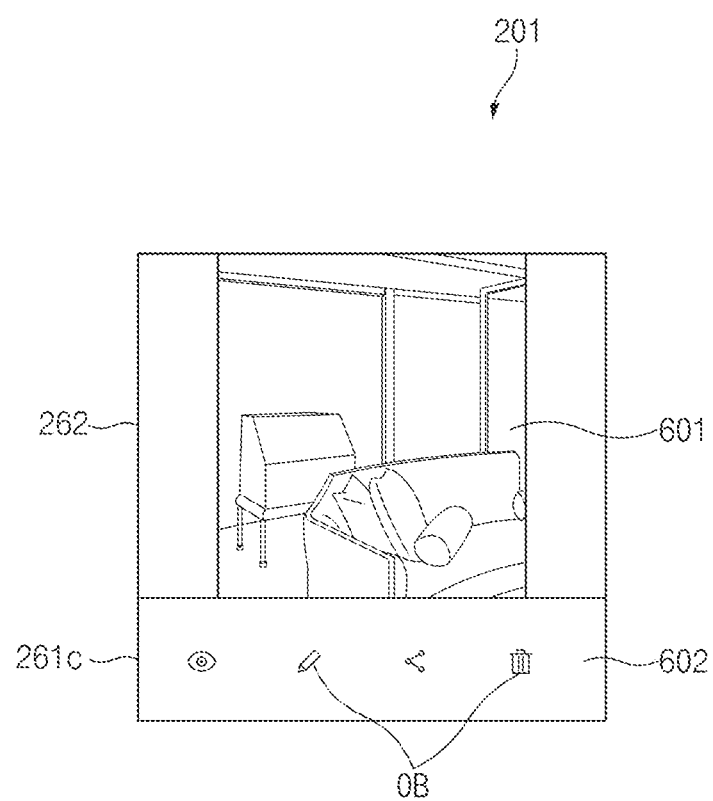
FIG. 14 is a diagram illustrating a first surface of a foldable electronic device, according to an embodiment.

FIGS. 13 and 14 are diagrams illustrating a first surface S1 of the foldable electronic device 201.

FIG. 13 is a diagram illustrating a fourth user interface displayed through the first display 261 in the unfolded state of the foldable electronic device 201, according to an embodiment.

Referring to FIG. 13, based on the foldable electronic device 201 being in the unfolded state, the foldable electronic device 201 may display the fourth user interface related to the application program being executed on the foldable electronic device 201 through the first display 261. As the application program being executed on the foldable electronic device 201, a gallery app that displays photos in a form of a slide show will be described as an example. The gallery app may acquire data related to the photos in real time and provide content in the form of the slide show.

The fourth user interface may be a screen of a result of executing the gallery app. The fourth user interface may be displayed over the first region 261a and the second region 261b of the first display 261. The fourth user interface may include a first portion 601 and a second portion 602.

The first portion 601 may contain at least a portion of content that acquires the data related to the photos in real time. The second portion 602 may include the at least one object 013 capable of controlling the content. Based on the input of selecting the at least one object OB being received, the foldable electronic device 201 may perform a function of editing or deleting the content contained in the first portion 601.

FIG. 14 is a diagram illustrating the first portion 601 of the fourth user interface displayed through the second display 262 and the second portion 602 of the fourth user interface displayed through the third region 261c of the first display 261 in the folded state of the foldable electronic device, according to an embodiment.

Referring to FIG. 14, based on the foldable electronic device 201 being in the folded state, the foldable electronic device 201 may display the first portion 601 of the fourth user interface through the second display 262, and display the second portion 602 of the fourth user interface through the third region 261c of the first display 261.

The foldable electronic device 201 may display the content related to the photos provided in the unfolded state of the foldable electronic device 201 as the first portion 601 through the second display 262. The foldable electronic device 201 may resize the content related to the photos provided in the unfolded state of the foldable electronic device 201, and display the resized content as the first portion 601 through the second display 262.

The foldable electronic device 201 may display the second portion 602 containing the at least one object OB that was provided in the unfolded state of the foldable electronic device 201 through the third region 261c of the first display 261. The foldable electronic device 201 may resize the second portion 602 provided in the unfolded state of the foldable electronic device 201, and display the resized second portion 602 through the third region 261c of the first display 261.

Hereinafter, an operation of a foldable electronic device 201 will be described with reference to FIGS. 15A, 15B, 16, and 17. For clarity of description, elements and/or portions of the foldable electronic device 201 that are duplicates of those described above will be omitted.

The operation described as being performed by the foldable electronic device 201 may be implemented with instructions (commands) that may be performed (or executed) by a processor 220 of the foldable electronic device. The instructions may be stored in a computer recording medium or the memory 230 of the foldable electronic device 201 illustrated in FIG. 5.

FIGS. 15A, 15B, 16, and 17 are diagrams illustrating a first surface S1 of the foldable electronic device 201.

Figure 15A:
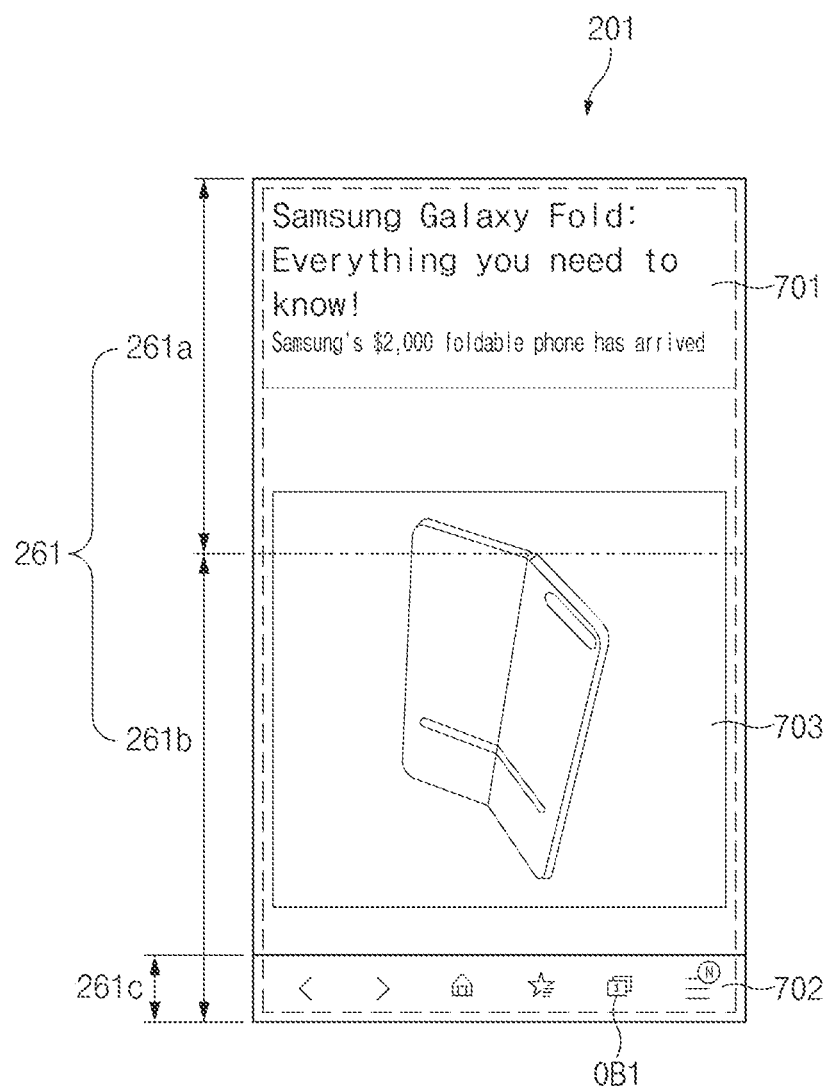
FIG. 15A is a diagram illustrating a first surface of a foldable electronic device, according to an embodiment.
Figure 15B:
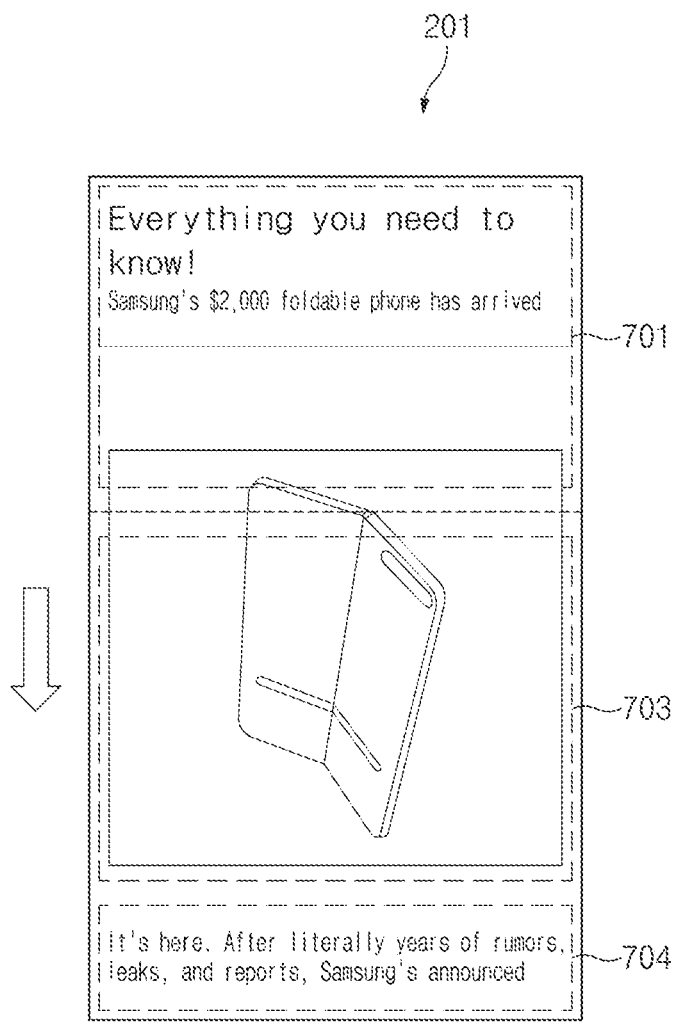
FIG. 15B is a diagram illustrating a first surface of a foldable electronic device, according to an embodiment.

FIGS. 15A and 15B are diagrams illustrating a fifth user interface displayed through the first display 261 in the unfolded state of the foldable electronic device 201, according to an embodiment.

Referring to FIG. 15A, based on the foldable electronic device 201 being in the unfolded state, the foldable electronic device 201 may display the fifth user interface related to the application program being executed on the foldable electronic device 201 through the first display 261. An Internet app will be described as an example of the application program being executed on the foldable electronic device 201.

The fifth user interface may be a screen of a result of executing the Internet app. The fifth user interface may be displayed over the first region 261a and the second region 261b of the first display 261. The fifth user interface may include a first portion 701, a second portion 702, and a third portion 703.

The first portion 701 and the third portion 703 of the fifth user interface may contain at least a portion of the content that acquires the data in real time. The first portion 701 may be a portion corresponding to the first region 261a of the first display 261.

The second portion 702 of the fifth user interface may include a first object OB1 that may control the content provided in the first portion 701 and the third portion 703. The second portion 702 of the fifth user interface may be the portion displayed based on the input.

Referring to FIG. 15B, based on an input of scrolling the fifth user interface shown in FIG. 15A in an arrow direction being received, the foldable electronic device 201 may display a portion of the first portion 701 and a fourth portion 704 viewed by the scrolling through the first display 261 without displaying the second portion 702.

For example, based on an input for scrolling in an opposite direction of the arrow being received, the foldable electronic device 201 may display the second portion 702 again through the first display 261 as shown in FIG. 15A. However, the embodiment disclosed in the disclosure is not limited to the arrow direction. The second portion 702 may be one portion of the fifth user interface that is temporarily displayed through the first display 261 when the input related to the specific gesture is received.

Figure 16:
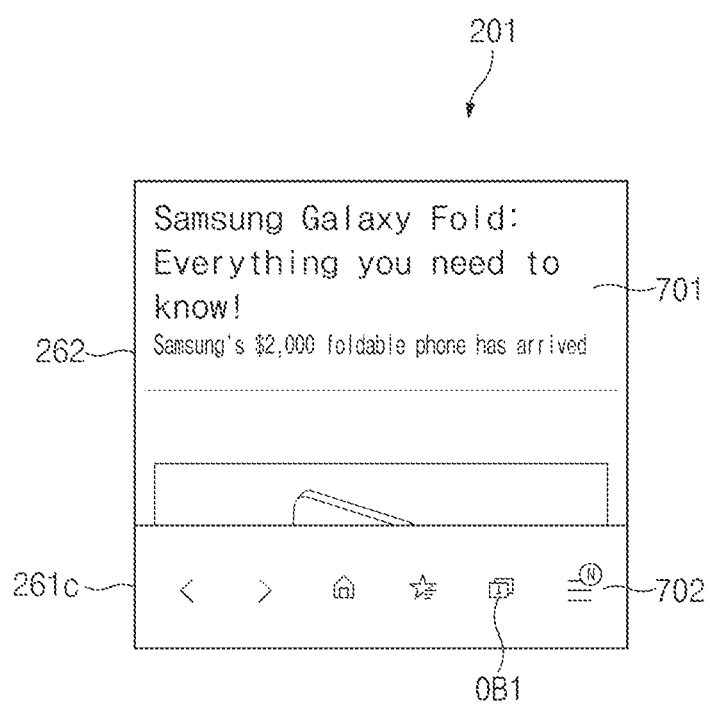
FIG. 16 is a diagram illustrating a first surface of a foldable electronic device, according to an embodiment.

FIG. 16 is a diagram illustrating the first portion 701 of the fifth user interface displayed through the second display 262 and the second portion 702 of the fifth user interface displayed through the third region 261c of the first display 261 in the folded state of the foldable electronic device, according to an embodiment.

Referring to FIG. 16, based on the foldable electronic device 201 being in the folded state, the foldable electronic device 201 may display the first portion 701 of the fifth user interface through the second display 262, and display the second portion 702 of the fifth user interface through the third region 261c of the first display 261.

Figure 17:
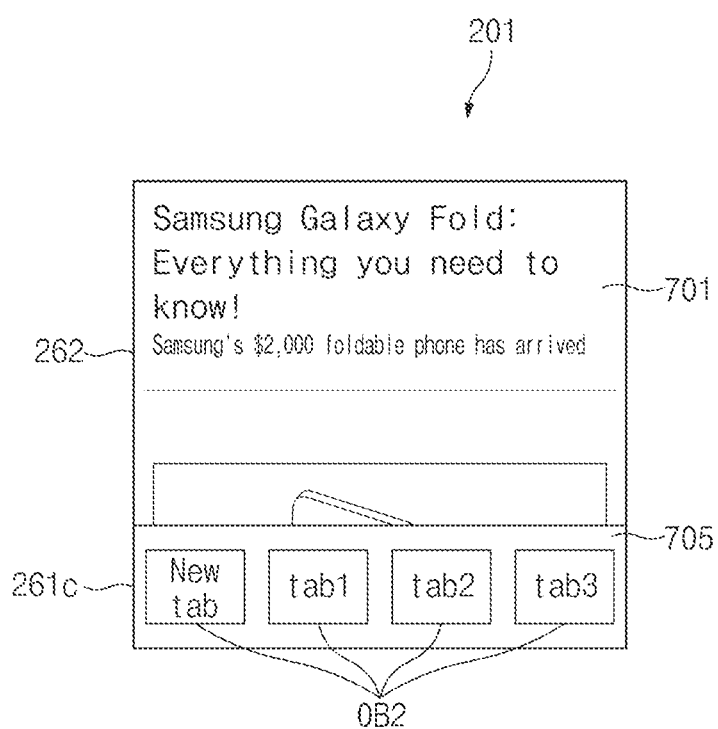
FIG. 17 is a diagram illustrating a first surface of a foldable electronic device, according to an embodiment.

FIG. 17 is a diagram illustrating the first portion 701 of the fifth user interface displayed through the second display 262 and a sixth user interface 705 displayed through the third region 261c of the first display 261 in the folded state of the foldable electronic device 201, according to an embodiment.

Referring to FIG. 17, the sixth user interface 705 may be a user interface provided based on an input of selecting the first object OB1 of the second portion 702 being received. The sixth user interface 705 may be a user interface related to the Internet app. The sixth user interface 705 may include second objects OB2. Based on that an input of selecting one of the second objects OB2 is received, the foldable electronic device 201 may provide a new user interface that provides content different from the content provided in the first portion 701 through the second display 262.

Based on the folded state of the foldable electronic device 201 being identified, the foldable electronic device 201 may receive the input of selecting the first object OB1 of the second portion 702 provided through the third region 261c of the first display 261. Based on the input of selecting the first object OB1 being received, the foldable electronic device 201 may provide the sixth user interface 705 through the third region 261c of the first display 261.

As shown in FIG. 17, based on the folded state of the foldable electronic device 201 being identified, the foldable electronic device 201 may provide the sixth user interface 705 through the third region 261c of the first display 261 instead of the second portion 702.

Hereinafter, an operation of a foldable electronic device 201 will be described with reference to FIGS. 18, 19, 20A, and 20B. For clarity of description, elements and/or portions of the foldable electronic device 201 that are duplicates of those described above will be omitted.

The operation described as being performed by the foldable electronic device 201 may be implemented with instructions (commands) that may be performed (or executed) by a processor 220 of the foldable electronic device. The instructions may be stored in a computer recording medium or the memory 230 of the foldable electronic device 201 illustrated in FIG. 5.

FIGS. 18, 19, 20A, and 20B are diagrams illustrating a first surface S1 of the foldable electronic device 201.

Figure 18:
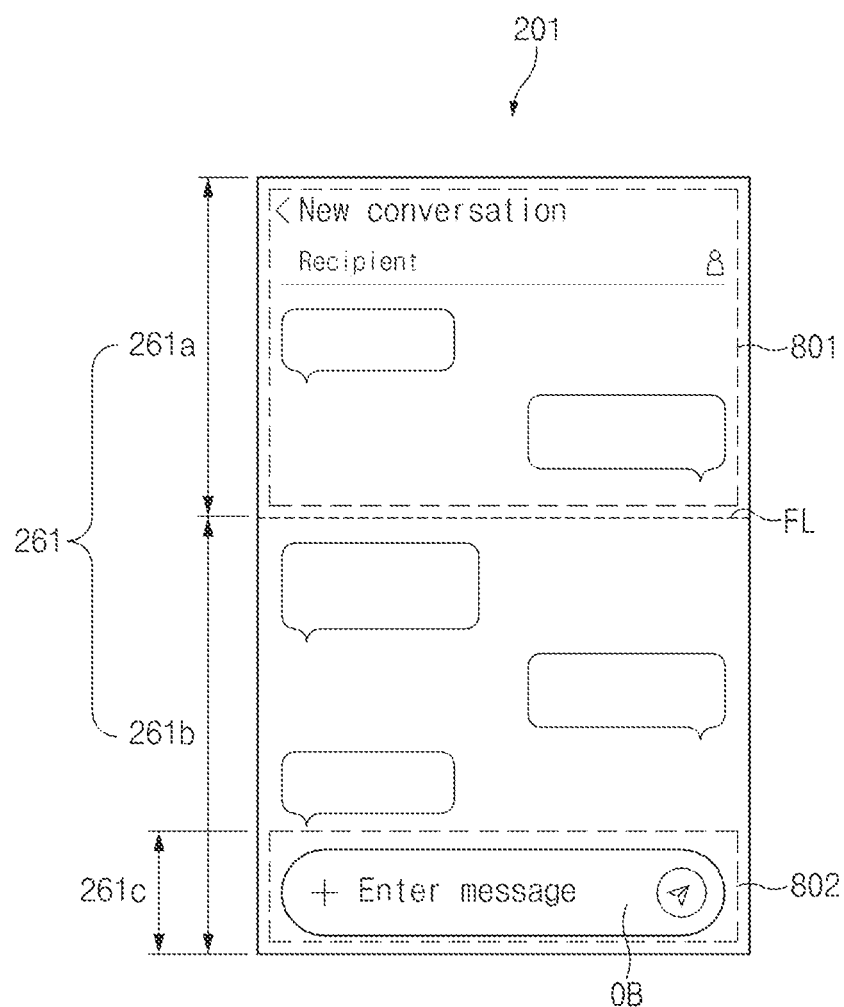
FIG. 18 is a diagram illustrating a first surface of a foldable electronic device, according to an embodiment.

FIG. 18 is a diagram illustrating a seventh user interface displayed through the first display 261 in the unfolded state of the foldable electronic device 201, according to an embodiment.

Referring to FIG. 18, based on the foldable electronic device 201 being in the unfolded state, the foldable electronic device 201 may display the seventh user interface related to the application program being executed on the foldable electronic device 201 through the first display 261. As the application program being executed on the foldable electronic device 201, a text message app capable of sending and receiving text messages will be described as an example.

The seventh user interface may be a screen of a result of executing the text message app. The seventh user interface may be displayed over the first region 261a and the second region 261b of the first display 261. The seventh user interface may include a first portion 801 and a second portion 802.

The first portion 801 may contain at least a portion of content showing data of sending and receiving the text messages in real time. The second portion 802 may include the object OB capable of inputting text.

Figure 19:
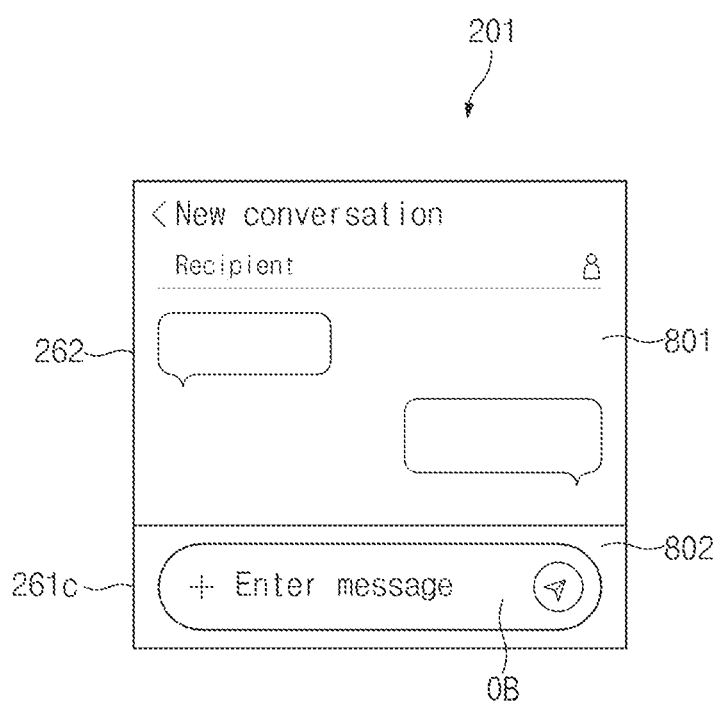
FIG. 19 is a diagram illustrating a first surface of a foldable electronic device, according to an embodiment.

FIG. 19 is a diagram illustrating the first portion 801 of the seventh user interface displayed through the second display 262 and the second portion 802 of the seventh user interface displayed through the third region 261c of the first display 261 in the folded state of the foldable electronic device, according to an embodiment.

Referring to FIG. 19, based on the foldable electronic device 201 being in the folded state, the foldable electronic device 201 may display the first portion 801 of the seventh user interface through the second display 262, and display the second portion 802 of the seventh user interface through the third region 261c of the first display 261.

Figure 20A:
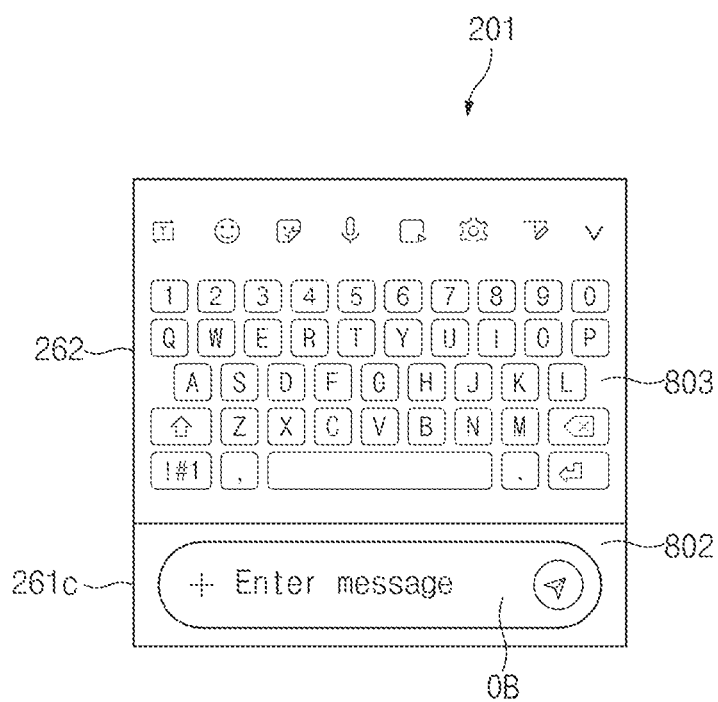
FIG. 20A is a diagram illustrating a first surface of a foldable electronic device, according to an embodiment.
Figure 20B:
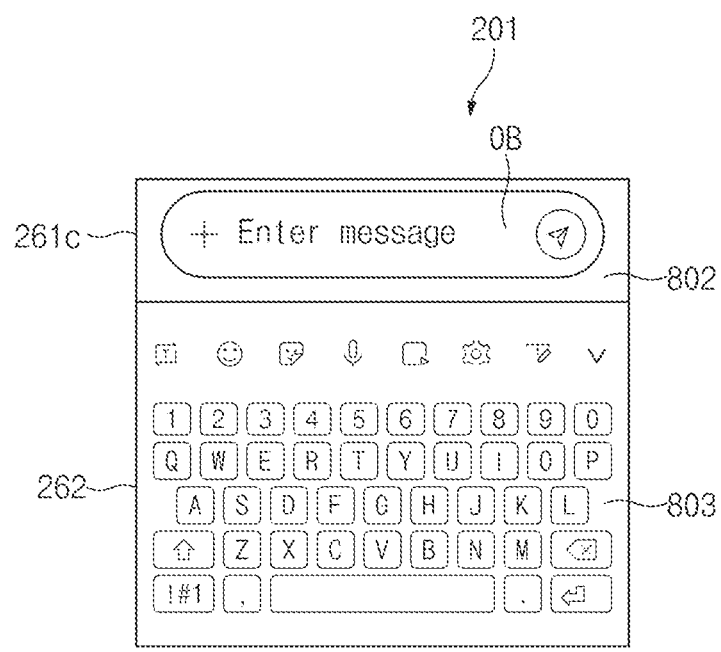
FIG. 20B is a diagram illustrating a first surface of a foldable electronic device, according to an embodiment.

FIGS. 20A and 20B are diagrams illustrating an eighth user interface 803 displayed through the second display 262 and the second portion 802 of the seventh user interface displayed through the third region 261c of the first display 261 in the folded state of the foldable electronic device, according to an embodiment.

FIG. 20B is an embodiment reversed in a vertical direction of FIG. 20A. Even when the foldable electronic device 201 is reversed in the vertical direction, in the folded state, the eighth user interface 803 may be displayed through the second display 262, and the second portion 802 of the seventh user interface may be displayed through the third region 261c of the first display 261.

Referring to FIGS. 20A and 20B, in the folded state of the foldable electronic device 201, based on the input of selecting the object OB being received, the foldable electronic device 201 may display the eighth user interface 803 provided related to the text message app on the second display 262 of the foldable electronic device 201. The eighth user interface 803 may be an interface capable of inputting letters, numbers, or symbols to the foldable electronic device 201.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B" "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor 120 of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or he distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Additionally or alternatively, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been particularly shown and described with reference to certain embodiments thereof, it will he understood by those of ordinary skill in the art that various changes in form and details may be made therein without departing from the spirit and scope of the disclosure as defined by the appended claims and their equivalents.

The invention claimed is:

1. A foldable electronic device comprising:
   a first display disposed on a first surface of the foldable electronic device and including a first region and a second region wider than the first region which are folded based on a folding line such that the first region and the second region face each other;
   a second display disposed on a second surface of the foldable electronic device opposite to the first surface and disposed to correspond to the first region;
   a state detection circuit for identifying a folded state and an unfolded state of the foldable electronic device;
   a processor; and
   a memory operatively connected to the processor,
   wherein, in the unfolded state, the first region and the second region of the first display are exposed toward the first surface and the second display is positioned toward the second surface opposite to the first surface,
   wherein, in the folded state, the second display and a first partial region of the second region not covered by the first region are exposed toward the first surface, and a second partial region of the second region other than the first partial region is positioned toward the first surface and not exposed by covering the first region of the first display,
   wherein the memory stores instructions that, when executed, cause the processor to:
   display a first user interface related to an application program being executed on the foldable electronic device through the first display based on the identification, by the state detection circuit, of the unfolded state;
   display a first portion of the first user interface through the second display exposed toward the first surface and display a second portion related to the first portion of the first user interface through the first partial region of the second region exposed toward the first surface, based on the identification, by the state detection circuit, of the folded state, and
   based on reception of an input for the second portion of the first user interface being displayed through the first partialregion of the second region, display a third portion related to the first portion of the first user interface through the first partial region of the second region.

2. The foldable electronic device of claim 1, wherein the first portion contains at least a portion of content acquiring data in real time, and wherein the second portion contains an object related to the content.

3. The foldable electronic device of claim 2, wherein the instructions cause the processor to control the content based on reception of an input of selecting the object.

4. The foldable electronic device of claim 1, wherein the instructions cause the processor to display, through the partial region of the second region, a portion displayed through the first display based on an input received by the foldable electronic device of the first user interface as the second portion.

5. The foldable electronic device of claim 4, wherein the first portion includes at least a portion of content acquiring data in real time, and wherein the second portion includes an object related to the content.

6. The foldable electronic device of claim 1, wherein the instructions cause the processor to display, through the first partial region of the second region, a second user interface related to a portion displayed through the first display based on an input received by the foldable electronic device of the first user interface as the second portion.

7. The foldable electronic device of claim 1, wherein the instructions cause the processor to display, based on reception of an input of selecting the second portion, a second user interface related to the application program and the input through the second display.

8. A method for displaying a user interface of a foldable electronic device including a first display disposed on a first surface of the foldable electronic device and including a first region and a second region wider than the first region which are folded based on a folding line such that the first region and the second region face each other and a second display disposed on a second surface of the foldable electronic device opposite to the first surface and disposed to correspond to the first region, the method comprising:
   identifying an unfolded state, wherein the unfolded state is a state where the first region and a second region of the first display are exposed toward the first surface and the second display is positioned toward the second surface opposite to the first surface;
   identifying a folded state, wherein the folded state is a state where the second display and a first partial region of the second region not covered by the first region are exposed toward the first surface, and a second partial region of the second region other than the first partial region is positioned toward the first surface and not exposed by covering the first region of the first display;
   displaying a first user interface related to an application program being executed on the foldable electronic device through the first display based on the identification of the unfolded state;
   displaying a first portion of the first user interface through the second display exposed toward the first surface and displaying a second portion related to the first portion of the first user interface through the first partial region of the second region exposed toward the first surface, based on the identification of the folded state; and
   based on reception of an input for the second portion of the first user interface being displayed through the first partial region of the second region, displaying a third portion related to the first portion of the first user interface through the first partial region of the second region.

9. The method of claim 8, wherein the first portion contains at least a portion of content acquiring data in real time, and wherein the second portion contains an object related to the content of the first user interface.

10. The method of claim 9, further comprising: controlling the content based on reception of an input of selecting the object.

11. The method of claim 8, wherein the second portion is a portion displayed through the first display based on an input received by the foldable electronic device of the first user interface.

12. The method of claim 8, wherein the second portion is a second user interface related to a portion displayed through the first display based on an input received by the foldable electronic device of the first user interface.

13. The method of claim 8, further comprising: displaying, based on reception of an input of selecting the second portion, a second user interface related to the application program and the input through the second display.

14. A non-transitory storage medium storing computer readable instructions, wherein, when executed by a foldable electronic device including a first display disposed on a first surface of the foldable electronic device and including a first region and a second region wider than the first region which are folded based on a folding line such that the first region and the second region face each other and a second display disposed on a second surface of the foldable electronic device opposite to the first surface and disposed to correspond to the first region, the instructions cause the foldable electronic device to:

identify an unfolded state, wherein the unfolded state is a state where the first region and a second region of the first display are exposed toward the first surface and the second display is positioned toward the second surface opposite to the first surface;

identify a folded state, wherein the folded state is a state where the second display and a first partial region of the second region not covered by the first region are exposed toward the first surface, and a second partial region of the second region other than the first partial region is positioned toward the first surface and not exposed by covering the first region of the first display;

display a first user interface related to an application program being executed on the foldable electronic device through the first display based on the identification of the unfolded state;

display a first portion of the first user interface through the second display exposed toward the first surface and display a second portion related to the first portion of the first user interface through the first partial region of the second region exposed toward the first surface, based on the identification of the folded state; and based on reception of an input for the second portion of the first user interface being displayed through the first partial region of the second region, display a third portion related to the first portion of the first user interface through the first partial region of the second region.

15. The storage medium of claim 14, wherein the first portion contains at least a portion of content of acquiring data in real time, wherein the second portion contains an object related to the content of the first user interface, and wherein, when executed by the foldable electronic device, the instructions further cause the foldable electronic device to control the content based on reception of an input of selecting the object.

16. The storage medium of claim 14, wherein the second portion is a portion displayed through the first display based on an input received by the foldable electronic device of the first user interface.

17. The storage medium of claim 14, wherein, when executed by the foldable electronic device, the instructions further cause the foldable electronic device to display, based on reception of an input of selecting the second portion, a second user interface related to the application program and the input through the second display.

* * * * *